May 9, 1933.  C. HAHN  1,908,419
APPARATUS FOR THE CONTINUOUS RECOVERY
OF ZINC FROM OXIDIZED ZINC ORES
Filed June 29, 1931   2 Sheets-Sheet 2
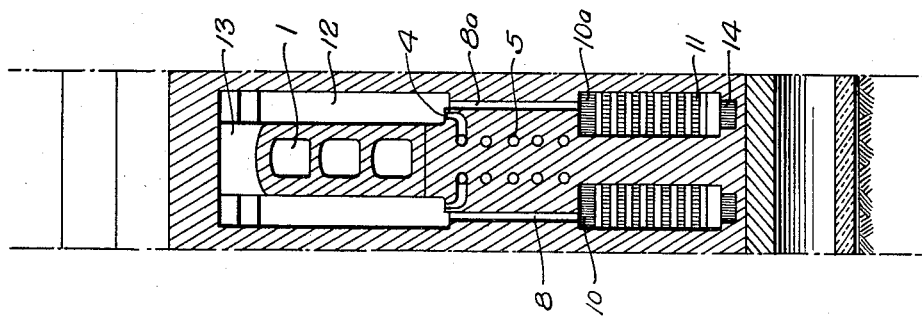
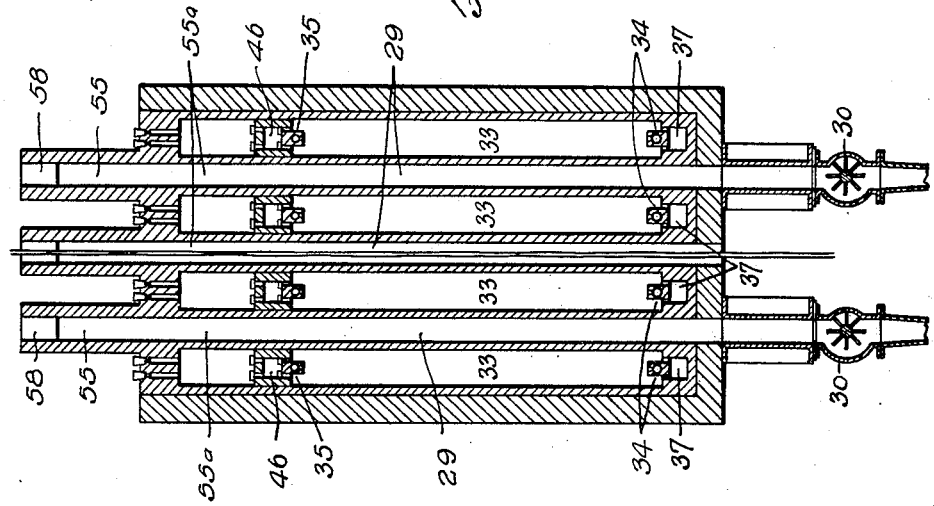
Inventor
Conrad Hahn.
By Henry Love Clarke
his Attorney Patented May 9, 1933

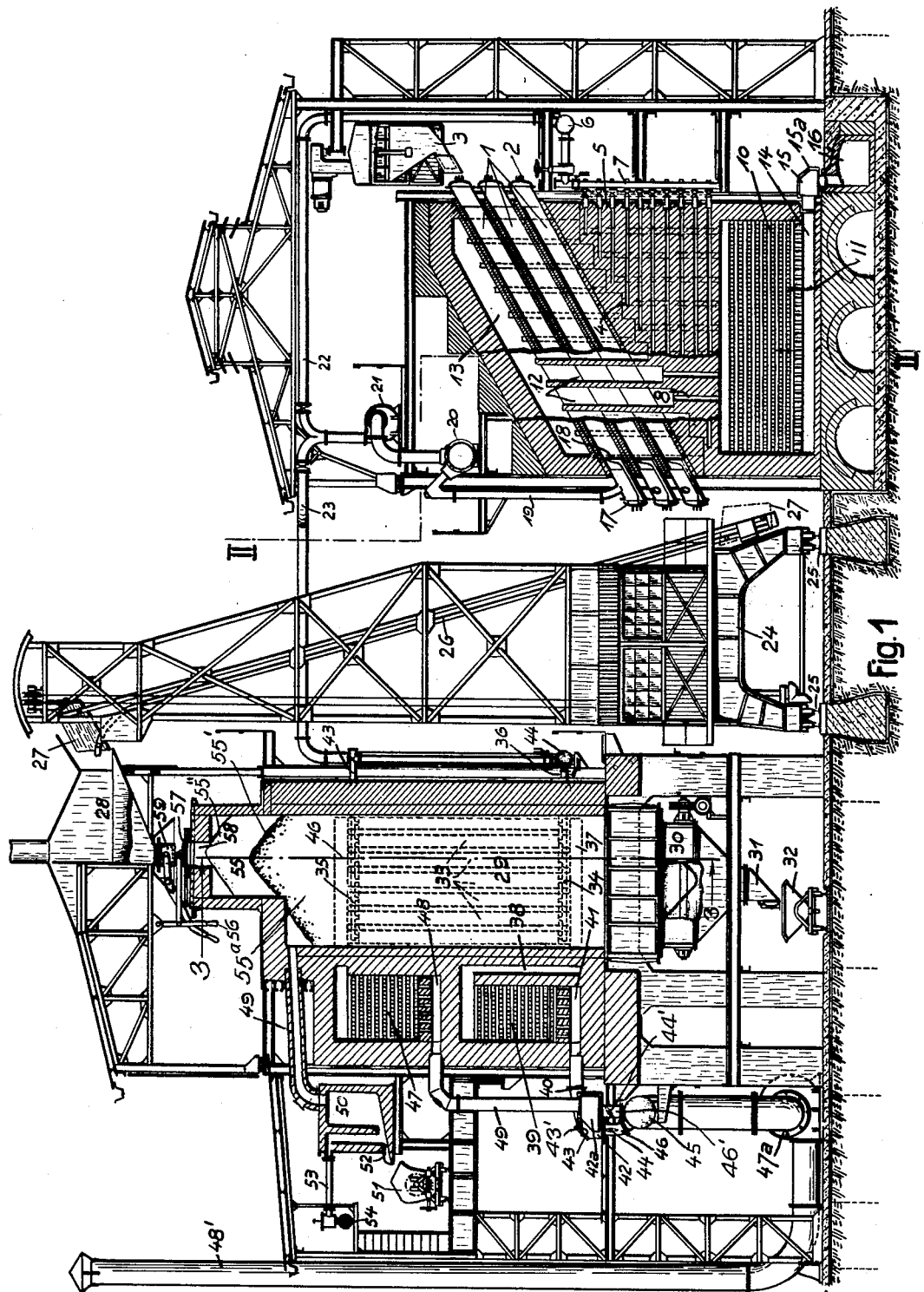

1,908,419

UNITED STATES PATENT OFFICE

CONRAD HAHN, OF ESSEN, GERMANY, ASSIGNOR, BY MESNE ASSIGNMENTS, TO THE KOPPERS COMPANY OF DELAWARE, OF PITTSBURGH, PENNSYLVANIA, A CORPORATION OF DELAWARE

APPARATUS FOR THE CONTINUOUS RECOVERY OF ZINC FROM OXIDIZED ZINC ORES

Application filed June 29, 1931. Serial No. 547,770.

The invention relates to apparatus for the continuous recovery of zinc from oxidized zinc ores and more especially to cases where apparatus is employed consisting of furnaces each forming separate units composed of several vertical retorts or inclined retorts for calcining, on the one hand, the zinc ore and coal combined, if necessary, with tar in briquette form, and on the other hand for the reduction of the zinc compounds in the calcined briquettes, the liberated zinc being simultaneously driven off.

The object of the invention is an improvement in connection with the said apparatus, permitting the contents of a retort of the calcining furnace to be immediately carried forward into the reduction furnace, as soon as same have been calcined in the desired manner, without any appreciable cooling off of the zinc ore coal briquettes which leave the calcining retort at a temperature of about 750° C., and further without loss through the charge, during charging, of zinc vapours being distilled off the ore-coal mixture and to be drawn off through an offtake therefor at the upper end of the reduction retorts.

For this purpose, according to the invention, the reduction retorts are each provided at their upper ends with a charging shaft, the volume of which is equal or greater than the volume of one retort of the calcining furnace, which serves for the carbonizing of the ore coal briquettes and furthermore the retorts of the calcining furnace are so formed that during the carbonizing period in one retort of the calcining furnace, such a quantity of the material charged is removed from one retort of the reduction furnace that in the charging shaft at the upper end of the reduction retort sufficient room is left free for taking the complete charge of one calcining retort.

Moreover, the invention relates to an apparatus for the continuous recovery of zinc of the kind mentioned in which the charging shafts on the upper end of the retorts of the reduction furnace are so formed that each of the charging shafts is separated off, by the charge introduced therein during the charging operation, from the outlet for the zinc vapours which is provided for at the upper end of the reduction retorts.

On the drawing there is shown apparatus suitable for the carrying out of the process in accordance with this invention: Fig. 1 is a vertical section; Fig. 2 is taken on the line II—II of Fig. 1; and Fig. 3 is taken on the line III—III of Fig. 1.

In the apparatus shown in the drawings, an inclined retort furnace provided with retorts 1 serve for the calcining of the zinc ore coal briquettes, prepared in an apparatus not indicated. The material is carried forward by means of a travelling receiver 3 to the retorts, which are closed at the upper end by the covers 2. The heating up of the calcining retorts is effected by a row of burners 4 to which the gas is led forward through the ducts 5, which are connected outside with the pipe 7, leading up to the collecting pipe line 6.

The air required for the combustion of the gas carried forward by the ducts 4 to the burners is supplied to the burners by the conduits 8 which start from the regenerators 10 arranged in the underpart of the furnace which as customary are fitted with refractory brickwork 11.

From the burners along each retort a heating flue 12 runs, which from both sides of the retort opens out into a collecting channel 13 above the inclined retorts 1. The heating flues, on the other side of the retort are connected in a similar manner with other regenerators and with the principal gas pipe line 6, the same as the first described heating flues.

The working of the calcining furnace is most suitably effected in such a way that alternatively the heating flues, on the one side of the retorts, are heated up by the flames and, on the other side, the hot waste gases are drawn off through the heating flues and the corresponding channels 8a into the nearest regenerator 10a and then through the connecting sole channel 14, below the elbow piece 15, and from there to the flue 16; and during this procedure the hot waste gases in the regenerator 10a give up the most part of their sensible heat to the chequer work of the regenerators.

The calcining retorts are closed at the lower end by the covers 17, which carry the stemming plates 18 reaching inwards. In the space between the stemming plates 18 and the covers 17 there opens out into each retort a gas draw-off pipe line 19 which goes forward to the customary main 20, which is common to all the retorts of the furnace. The main 20 is connected up with the fan 21 by means of which gases are by suction drawn off from the calcining retorts and led forward under pressure partly through the pipe line 22 into the gas collecting pipe line 6 and through the piping 23 into the gas collecting pipe line of the reducing furnace which will be described later.

From the exit side of the reducing oven a charging elevator apparatus 24 is arranged for travelling on the rails 25. The apparatus 24 is fitted with a lift skip 27, which is moved along the running rail 26, so that the skip lies at the lower end of the rails underneath the outlet end of the calcining retort. The skip is of such capacity as to hold the whole content of a calcining retort 1, which glides off, under gravity, from the retort into the skip 27 after the cover 17 is removed.

On the upper end of the running rail 26, the latter is so formed that when the skip is raised to the top it tips upwardly so as to discharge its contents into the receiving hopper 28.

Below the hopper 28, the reducing furnace is set which serves for the reducing of the oxidized zinc compounds present in the calcined zinc ore coal briquettes. This reducing furnace consists of a number of continuous vertical reducing retort chambers 29 arranged close to one another, which below are closed at their discharge bottoms by means of one of the ordinary dischargers, effecting continuous discharge of solid residues from the reduction retort chamber into a run-off hopper 31 by means of which the solid residue is delivered into a traveling receiver 32 underneath the reducing retort. The heating of the reducing retorts is effected by the heating walls arranged between same and provided with a row of vertical heating flues 33 each of which are fitted above and below with a burner 34 and 35 respectively. To the lower burners heating gas is led through the pipe 36 and air through the conduit 37. The conduit 37 is connected up by means of a vertical conduit 38 with a regenerator 39 situated alongside lower part of the furnace, and fitted in the customary manner with chequer work 40, the bottom channel 41 of which is connected up with the elbow piece 42 outside of the furnaces, the importance of which will be explained later.

The top burners 35 of the heating flues 33 are connected up by the conduit 43 with a gas collecting pipe line 44 whereas a channel 46 serves to supply the combustion air to the burners 35 and is connected up with a regenerator 47 from the sole channel 48 of which a pipe line 49 likewise leads to a similar elbow piece 42a.

The elbow pieces 42 and 42a serve like the elbow pieces 15 and 15a of the calcining furnace for the changing over of the gas current, when the heating in the flues 33 is changed over. When the latter is fired downwardly from above i. e. by the flames of the burners 35 then the elbow piece 42a is so adjusted that waste gas valve 44' the air valve 43' is open and atmospheric air can be drawn under suction into the elbow piece and from there through the pipe line 49 into the regenerator 47. Simultaneously the air valve 43 of the elbow piece 42 is closed and on the other hand a water gas valve 44 provided in the interior of the elbow piece 42 is opened which opens communication with a connecting pipe line 46 leading to the waste gas collecting channel 45 from the interior of the elbow piece 42. The waste gases streaming through the regenerator 39 are drawn off through the elbow piece 42 and the conduit 46 into the gas collection pipe line 45 by means of a fan 47a from whence they are led off under pressure to the chimney 48'. After every thirty minutes, these valves are reversed so that in alternate periods air flows in regenerators 39 to burners 34 and waste gas flows out through 35, 47, 49, 42, 46, 45, 47a, to the stack 48'. During this period fuel gas and air are not supplied to burners 35.

On the upper ends of each of the reduction retorts 29 there is provided a gas offtake channel 49 for the zinc vapours evolved during the reduction process in the retorts 29. This channel 49 discharges into a metallic vapour condenser 50, in which the metallic vapours are so far cooled down that the metal condenses out on the bottom of the condenser 50 in liquid form. The metal flows out from the condenser 50 preferably continuously through the outlet 52 into one of the travelling receivers 51 placed before the condenser outlet, whereas the non-condensed gases are drawn off from the condenser through the pipe line 53 and 54.

The reduction retorts are narrower above the point of communication of the channel 49 with the lead condensation zone 55a of the reduction retorts 29 so as to provide a charging shaft or neck 55, and this neck is so constructed that the side of the charging shaft 55, situated opposite the outlet to the channel 49, lies in a line with the head wall of the reducing retort opposite the outlet to channel 49. Thus there is brought about in the case of a charged retort, a one-sided heaping up of the charge in the reduction retort so as to provide in front of the outlet to the channel 49 a three-cornered gas collecting space which is closed off from the charging shaft 55 by the material charged into the retort.

The size of the charging shaft 55 and the form of the reduction retorts as well as the heating arrangement are so chosen that, on the one hand, in a charging shaft 55 of the reducing retort, at least the content of one retort of the calcining furnace, indicated between lines 55' and 55", can be completely taken up and, on the other hand, the time required for the carbonizing process, in a retort of the calcining furnace, is such that, when the material is continuously drawn off from the reduction retorts such a space is left free in the charging shafts that a charge of a calcining retort can be completed and delivered to a charging shaft, without, previous to such delivery, the seal for the gas collecting space in front of the outlet to the channel 49 from the charging shaft 55, formed by material in the retort 29, being broken by the top of the charge descending below the line indicated at 55'. Each upper inlet opening 58 of the charging shafts 55 is closed by means of the removable covers 57 which are operable by means of the hand lever 56. The inlet opening 58 is situated underneath the sleeve 59 of an individual hopper 28, provided for each retort, and the sleeve 59 is so formed that the material from the hopper 28 can, when the cover 57 is open, be filled directly into the charging shaft 55 from the hopper 28.

The invention as hereinabove set forth is embodied in a particular form of construction, but may be variously embodied within the scope of the claims hereinafter made.

I claim:

1. Apparatus for the continuous recovery of zinc from briquettes made of oxidized zinc-ore and coal, comprising: a calcining furnace having retorts adapted for discharge of solid residue with the aid of gravity for calcining zinc-ore coal briquettes; a reduction furnace disposed closely adjacent said calcining furnace and having retorts adapted for discharge of solid residue with the aid of gravity for reducing the calcined zinc-ore of said briquettes; a charging shaft provided as a part of the upper end of each of said reducing retorts and each of a volume at least equal to the volume of the residue of the respective calcining furnace retorts; means at the lower end of each of the reducing retorts adapted for removal, during the period required to complete calcining of the charge of briquettes in the respective calcining retorts, of so much solid residue from their respective reducing retorts that the whole content of one of the calcining retorts, when completed can be accommodated in the charging shafts of the respective reducing retorts; and means for conveying the contents of one of the calcining retorts, while still hot therefrom, directly to one of said charging shafts.

2. Apparatus for the continuous recovery of zinc from briquettes made of oxidized zinc-ore and coal, comprising: a calcining furnace having retorts adapted for discharge of solid residue with the aid of gravity for calcining zinc-ore coal briquettes; a reduction furnace disposed closely adjacent said calcining furnace and having retorts adapted for discharges of solid residue with the aid of gravity for reducing the calcined zinc-ore of said briquettes; a charging shaft provided as a part of the upper end of each of said reducing retorts and each of a volume at least equal to the volume of the residue of the respective calcining furnace retorts; means at the lower end of each of the reducing retorts adapted for removal, during the period required to complete calcining of the charge of briquettes in the respective calcining retorts, of so much solid residue from their respective reducing retorts that the whole content of one of the calcining retorts, when completed can be accommodated in the charging shafts of the respective reducing retorts; means for conveying the contents of one of the calcining retorts, while still hot therefrom, directly to one of said charging shafts, and a gas offtake communicating with each of the reducing retorts at the upper part thereof but below the charging shaft; each of the aforesaid charging shafts being of a cross-sectional area smaller than the cross-sectional area of the reducing retort therefor.

3. Apparatus for the continuous recovery of zinc from briquettes made of oxidized zinc-ore and coal, comprising: a calcining furnace having retorts adapted for discharge of solid residue with the aid of gravity for calcining zinc-ore coal briquettes; a reduction furnace disposed closely adjacent said calcining furnace and having retorts adapted for discharge of solid residue with the aid of gravity for reducing the calcined zinc-ore of sid briquettes; a charging shaft provided as a part of the upper end of each of said reducing retorts and each of a volume at least equal to the volume of the residue of the respective calcining furnace retorts; means at the lower end of each of the reducing retorts adapted for removal, during the period required to complete calcining of the charge of briquettes in the respective calcining retorts, of so much solid residue from their respective reducing retorts that the whole content of one of the calcining retorts, when completed can be accommodated in the charging shafts of the respective reducing retorts, means for conveying the contents of one of the calcining retorts, while still hot therefrom, directly to one of said charging shafts, a gas offtake communicating with each of the reducing retorts at the upper part thereof but below the charging shaft; each of the aforesaid charging shafts being of a cross-sectional area smaller than the cross-sectional area of the reducing retorts therefor; and the walls of the charging shafts above the gas offtakes being offset therefrom so as to provide space for a mound of calcined material adjacent each of the gas offtakes for sealing off the gas offtakes from the charging shaft.

4. Apparatus for the continuous recovery of zinc from briquettes made of oxidized zinc-ore and coal, comprising: a calcining furnace having retorts adapted for discharge of solid residue with the aid of gravity for calcining zinc-ore coal briquettes; a reduction furnace disposed closely adjacent said calcining furnace and having retorts adapted for discharge of solid residue with the aid of gravity, for reducing the calcined zinc-ore of said briquettes; a charging shaft provided as a part of the upper end of each of said reducing retorts and each of a volume at least equal to the volume of the residue of the respective calcining furnace retorts; means at the lower end of each of the reducing retorts adapted for removal, during the period required to complete calcining of the charge of briquettes in the respective calcining retorts, of so much solid residue from their respective reducing retorts that the whole content of one of the calcining retorts, when completed can be accommodated in the charging shafts of the respective reducing retorts; a rail track; a transport vessel of a size adapted to receive and convey the entire contents of one of the calcining retorts and arranged for running on the rail track for conveying said contents directly to the charging shaft of one of the reducing retorts, whereby calcined material may be delivered while still hot from the calcining retorts to the reduction retorts.

5. Apparatus for the continuous recovery of zinc from briquettes made of oxidized zinc-ore and coal, comprising: a calcining furnace having retorts adapted for discharge of solid residue with the aid of gravity for calcining zinc-ore coal briquettes; a reduction furnace disposed closely adjacent said calcining furnace and having retorts adapted for discharge of solid residue with the aid of gravity for reducing the calcined zinc-ore of said briquettes; a charging shaft provided as a part of the upper end of each of said reducing retorts and each of a volume at least equal to the volume of the residue of the respective calcining furnace retorts; means at the lower end of each of the reducing retorts adapted for removal, during the period required to complete calcining of the charge of briquettes in the respective calcining retorts, of so much solid residue from their respective reducing retorts that the whole content of one of the calcining retorts, when completed can be accommodated in the charging shafts of the respective reducing retorts; a gas offtake communicating with each of the reducing retorts at the upper part thereof but below the charging shaft; each of the charging shafts being of a cross-sectional area smaller than the cross-sectional area of the reducing retorts therefor; means for conveying calcined material directly from the calcining retorts to the charging shafts, said means comprising a rail track and a conveying vessel arranged for travel of the vessel between the retorts of the calcining furnace and the charging shafts of the reduction furnace and means for conducting the material from the top end of the rail track to the charging shafts of the reducing retorts.

6. Apparatus for continuous recovery of zinc from briquettes of oxidized zinc-ore and coal comprising: a calcining furnace having retorts adapted for discharge of solid residue by gravity for calcining zinc-ore coal briquettes; a reduction furnace having retorts adapted for discharge of solid residue by gravity and each having an upper charging shaft in open communication therewith for reducing the calcined zinc-ore of said calcined briquettes; means for effecting continuous discharge of solid residue from said reduction retorts; conveying means for conveying finished material from the calcining retorts to said charging shafts; said calcining and reduction furnaces and said conveying means being located closely adjacent each other whereby said conveying means may convey and deliver finished material from the calcining retorts directly to the charging shafts while still hot from the calcining furnace; heating means for effecting heating of said furnace retorts by extraneous combustion of gases; and means for commingling and conveying distillation gases from said retorts to said heating means for said combustion.

In testimony whereof I affix my signature.

CONRAD HAHN.